United States Patent [19]
Ozawa et al.

[11] Patent Number: 5,385,979
[45] Date of Patent: Jan. 31, 1995

[54] PRIMER AND ADHESIVE COMPOSITIONS BASED ON CHLORINATED POLYOLEFINS HAVING HIGH CHLORINE CONTENTS

[75] Inventors: Hiroyoshi Ozawa, Tokyo; Noboru Kamiya, Saitama; Ryuji Futaya, Yamanashi, all of Japan

[73] Assignee: Lord Corporation, Erie, Pa.

[21] Appl. No.: 179,911

[22] Filed: Jan. 11, 1994

[51] Int. Cl.[6] .............. C08L 61/04; C08L 61/10; C08L 23/28
[52] U.S. Cl. .................... 525/145; 525/144; 525/240
[58] Field of Search .............. 525/145, 144, 240

[56] References Cited

U.S. PATENT DOCUMENTS

| | | | |
|---|---|---|---|
| 3,258,388 | 6/1966 | Coleman et al. | 161/218 |
| 3,258,389 | 6/1966 | Coleman et al. | 161/218 |
| 4,452,926 | 6/1984 | Matsushima et al. | 524/509 |
| 5,180,791 | 1/1993 | Kimura et al. | 525/358 |

FOREIGN PATENT DOCUMENTS

| | | |
|---|---|---|
| 3-199206A | 8/1991 | Japan . |
| 3-199207A | 8/1991 | Japan . |
| 3-199274A | 8/1991 | Japan . |
| 4-036302A | 2/1992 | Japan . |
| 4-046905A | 2/1992 | Japan . |
| 4-173808A | 6/1992 | Japan . |
| 2239457A | 7/1991 | United Kingdom . |

*Primary Examiner*—James J. Seidleck
*Assistant Examiner*—W. Robinson H. Clark

[57] ABSTRACT

Adhesive compositions based on chlorinated polyolefins having chlorine contents greater than about 60 percent and molecular weights greater than about 500. The adhesive compositions contain the chlorinated polyolefin and a phenolic resin. The chlorinated polyolefins are advantageous in that they can be prepared in an environmentally acceptable manner and can be utilized as a substitute for the traditional chlorinated natural rubber materials utilized in adhesive compositions without compromising adhesive performance. Preferred chlorinated polyolefins are prepared by a process involving the dispersion and chlorination of high surface area polyolefinic particles in an aqueous medium.

21 Claims, No Drawings

PRIMER AND ADHESIVE COMPOSITIONS BASED ON CHLORINATED POLYOLEFINS HAVING HIGH CHLORINE CONTENTS

FIELD OF THE INVENTION

The present invention relates to adhesive compositions useful for bonding various materials such as elastomeric materials to metal substrates. More specifically, the present invention relates to adhesive compositions based on chlorinated polyolefins having significantly high chlorine contents.

BACKGROUND OF THE INVENTION

There is a wide variety of adhesive compositions currently available for bonding elastomeric materials to metal surfaces. Many of these adhesive compositions utilize various halogenated polymers to provide the adhesive compositions with film-forming capability, enhanced adhesion, and resistance to adverse environmental conditions. One of the most common and most effective halogenated polymeric materials is chlorinated natural rubber or chlorinated synthetic rubber such as chlorinated polyisoprene. The chlorinated natural and synthetic rubbers have been found to provide excellent film-forming properties, adhesional affinity for both metal surfaces and vulcanizing elastomers, and environmental resistance when utilized in adhesive compositions for bonding elastomeric materials to metal surfaces.

The process for preparing the chlorinated rubber materials traditionally employed in adhesive compositions typically involves the utilization of highly chlorinated solvents such as carbon tetrachloride. The increasing number of environmental regulations relating to chlorinated solvents has limited the availability and usability of many chlorinated solvents. In fact, the utilization of chlorinated solvents in industry may become totally prohibited in the very near future.

Processes for preparing chlorinated rubber materials which do not utilize chlorinated solvents are therefore currently being explored. However, a process has yet to be developed which produces chlorinated rubber materials equivalent to the materials produced by a process based on chlorinated solvents such as carbon tetrachloride. Therefore, the adhesive industry is searching for materials which can be prepared without the utilization of chlorinated solvents and which can act as an effective substitute for the traditional chlorinated rubber materials.

Chlorinated polyolefins, such as chlorinated polyethylene, can be prepared without the utilization of chlorinated solvents and have previously been considered for utilization in rubber-to-metal adhesive compositions as alternatives to chlorinated rubber materials. Chlorinated polyolefins, however, have traditionally not provided adequate metal-wetting capability or environmental resistance so as to be effective for use in rubber-to-metal adhesive compositions.

A need therefore exists for a chlorinated polymeric material which can be prepared without the utilization of chlorinated solvents and which can be utilized as an effective substitute for the traditional chlorinated rubber materials.

SUMMARY OF THE INVENTION

The present invention relates to chlorinated polyolefins which can be prepared without the utilization of chlorinated solvents and which can be utilized in rubber-to-metal adhesive compositions so as to provide effective metal-wetting capability, resistance to phase separation upon storage, adhesional affinity for vulcanizing rubber, and environmental resistance. It has presently been unexpectedly discovered that chlorinated polyolefins having significantly high chlorine contents can be utilized in adhesive compositions so as to provide performance equivalent to or greater than the performance provided by the traditional chlorinated rubber materials utilized in adhesive compositions. More specifically, the present invention relates to an adhesive composition comprising a chlorinated polyolefin and a phenolic resin wherein the chlorinated polyolefin has a chlorine content greater than about 60 percent and a molecular weight greater than about 500. The highly chlorinated polyolefins of the invention are preferably prepared by a process involving the dispersion and chlorination of high surface area polyolefinic particles in an aqueous medium.

DETAILED DESCRIPTION OF THE INVENTION

The polyolefin of the chlorinated polyolefin of the present invention can essentially be any polyolefin derived from ethylene and/or propylene monomers. Typical examples of polyolefins that can be utilized to prepare the chlorinated polyolefins of the present invention include polyethylene, polypropylene, ethylene-propylene copolymer, ethylene-propylene-diene terpolymer, ethylene-propylene-hexadiene terpolymer, ethylene-propylene-dicyclopentadiene terpolymer, ethylene-propylene-ethylidenenorbornene terpolymer, with polyethylene being presently preferred.

The polyolefins of the invention may be chlorinated by techniques such as dissolving or dispersing the polyolefin in a solvent or water and subjecting the resulting solution to chlorine gas. Other chlorination methods suitable for preparing the chlorinated polyolefins of the present invention include directing chlorine gas into melted or molten polyolefin. Whatever method is utilized, it is essential that the chlorination be carried out until the chlorine content of the polyolefin is in the range from about 60 to 75 percent, preferably from about 65 to 70 percent. The chlorinated polyolefins will typically have a molecular weight ranging from about 500 to 15,000, preferably from about 1,000 to 7,000. A chlorinated polyolefin having the specific chlorine contents and molecular weights described above will also typically have a viscosity in toluene at 20 weight percent and 25° C. of between about 10 centipoise and 500 centipoise, preferably between about 100 centipoise and 350 centipoise. As stated above, it is the significantly high chlorine content that has presently been found to cause the chlorinated polyolefins to exhibit the superior properties of the present invention.

A certain class of polyolefins has been found to be particularly useful in adhesive compositions for purposes of the present invention. This class of chlorinated polyolefins is prepared from environmentally acceptable processes which do not involve the utilization of chlorinated solvents such as carbon tetrachloride. These environmentally acceptable processes have been found to readily produce chlorinated polyolefins having the significantly high chlorine contents required by the present invention. A number of these environmentally acceptable processes are disclosed in, for example, Japanese Patent Application Nos. 4173808, 4036302, 3199274, 3199206, 3199207, and 4046905 as well as in U.S. Pat. No. 5,180,791.

An exemplary environmentally acceptable process utilized to prepare the preferred chlorinated polyolefins of the invention generally first involves the formation of a suspension or dispersion of a fine polyolefin powder having a high surface area in water. The suspension or dispersion is typically stabilized by the use of a surfactant such as non-ionic and/or anionic type surfactants. Examples of non-ionic type surfactants include polyoxyalkylene condensates of long chain fatty acids or alcohols such as stearic acid or oleyl alcohol, or sorbitan derivatives of same, such as sorbitan monostearate and their combinations, while examples of anionic type surfactants include long chain fatty acid soaps such as sodium stearate, alcohol sulfates, and related materials. A preferred anionic surfactant for preparing an aqueous suspension or dispersion of polyethylene powder is sodium stearate.

The aqueous suspension or dispersion of the polyolefin is then typically subjected to chlorine gas in the presence of free-radical initiators or ultraviolet irradiation. The chlorination is normally carried out in the temperature range from about 0° C. to 70° C. The chlorination process may be interrupted at a point where the polyolefin chlorine content is less than 60 percent and the dispersion then ball-milled or processed mechanically so as to expose the inner portion of each dispersed polyolefin particle. This enables chlorination to proceed at a faster rate than would be otherwise possible from that point. It is important that chlorination conditions be not so severe as to cause considerable chain scissioning of the polyolefin polymer chains. When the desired chlorination level is reached, the chlorinated polyolefin may be separated by filtration, washed with water, and dried under vacuum.

An example of a preferred environmentally acceptable process useful for preparing the high chlorine content chlorinated polyethylenes of the present invention utilizes finely pulverized polyolefin powder having a surface area of from about 300 to 20,000 cm$^2$/g suspended in an aqueous medium and is described in detail in UK Patent Application No. 2 239 457A and U.S. Pat. No. 5,180,791.

The chlorinated polyolefins are typically utilized in an amount ranging from about 5 to 95, preferably from about 25 to 70, and most preferably from 35 to 70, percent by weight of the essential ingredients of the present adhesive composition. Essential ingredients of the present adhesive composition herein refers to the chlorinated polyolefin and the phenolic resin.

The phenolic resins useful in the adhesive compositions of the present invention can essentially be any heat-reactive phenolic resin which adsorbs efficiently on to metal surfaces in conjunction with the chlorinated polyolefin. Heat-reactive phenolic resins are typically prepared, for example, by reacting a phenolic compound with an aldehyde compound under acidic, neutral or basic conditions with an appropriate catalyst. Phenolic resins useful in the invention include unmodified phenolic resins, cashew-modified phenolic resins, epoxy-modified phenolic resins, and elastomer-modified phenolic resins. Mixtures of dissimilar phenolic resins may also be utilized.

The phenolic compound useful for preparing the present phenolic resins can be a monohydroxy aromatic compound, a multihydroxy aromatic compound or a combination thereof. The phenolic compound may be substituted with groups such as alkyl (e.g., ethyl, propyl, butyl), alkoxy, amino, halogen and the like. Examples of phenolic compounds useful in the invention include phenol, p-tert-butylphenol, p-phenylphenol, o-ethylphenol, p-chlorophenol, p alkoxyphenol, o-cresol, m-cresol, p-cresol, o-chlorophenol, m-bromophenol, 2-ethylphenol, p-tert-amylphenol, p-octylphenol, nonylphenol, cashew nutshell liquid, resorcinol, phloroglucinol, catechol, pyrocatechol, pyrogallol, naphthol, xylenol, diphenylolpropane, salicylic acid, bisphenol S, p,p'-dihydroxydiphenylether, combinations thereof, and the like, with phenol being presently preferred.

The aldehyde compound useful for preparing the phenolic resins of the present invention can be any aldehyde compound previously known for this purpose. Examples of aldehyde compounds useful in the invention include formaldehyde, acetaldehyde, propionaldehyde, isobutyraldehyde, 2-ethylbutrylaldehyde, 2-methylpentaldehyde, and 2-ethylhexaldehyde. The aldehyde compound of the invention may also be any of the other various forms of formaldehyde, including compounds which decompose to formaldehyde such as paraformaldehyde, trioxane, furfural, hexamethylenetetramine, benzaldehyde, and the like. The aldehyde compound can also be any of the acetals which liberate formaldehyde upon heating. Aldehyde compounds having from 1 to 6 carbon atoms are generally preferred with formaldehyde being the presently most preferred aldehyde compound.

The phenolic resin is preferably formed in a conventional manner from the condensation of from about 0.8 to 5 moles of aldehyde compound per mole of phenolic compound to afford an organic solvent-soluble resin having a molecular weight in the range of from about 200 to 2,000, preferably from about 300 to 1,200. The phenolic resin may be prepared as a resole or a novolac phenolic resin by controlling the amount of aldehyde compound and type of catalyst (acid v. base) as is known in the art. If a novolac phenolic resin is utilized in the present invention, it is necessary to utilize a curing agent in the adhesive composition that will act to fully cure or crosslink the novolac phenolic resin. Typical crosslinking agents useful for this purpose include formaldehyde; compounds which decompose to formaldehyde such as paraformaldehyde, s-trioxane, hexamethylene tetramine, anhydrofor-maldehydeaniline, ethylene diamine formaldehyde; methylol derivatives of urea and formaldehyde; acetaldehyde; furfural; methylol phenolic compounds; and the like. These organic compounds are considered methylene donors in that they effect rapid crosslinking of heat fusible novolac resins with methylene or equivalent linkages by the application of heat.

Additionally, and preferred over the crosslinking agents discussed immediately above, high molecular weight aldehyde homopolymers and copolymers can be employed as a latent crosslinking agent in the practice of the present invention. A latent crosslinking agent herein refers to a crosslinking agent which will release formaldehyde only in the presence of heat such as the heat applied during the curing of an adhesive system. Typical high molecular weight aldehyde homopolymers and copolymers include acetal homopolymers, acetal copolymers, gamma-polyoxymethylene ethers having the characteristic structure:

$R_{10}O-(CH_2O)_n-R_{11}$; and polyoxymethylene glycols having the characteristic structure:

$HO-(R_{12}O)_{\overline{x}}-(CH_2O)_{\overline{n}}-(R_{13}O)_{\overline{x}}-H$;

wherein $R_{10}$ and $R_{11}$ can be the same or different and each is an alkyl group having from 1 to 8, preferably 1 to 4, carbon atoms; $R_{12}$ and $R_{13}$ can be the same or different and each is an alkylene group having from 2 to 12, preferably 2 to 8, carbon atoms; n is greater than 100, and is preferably in the range from about 200 to about 2000; and x is in the range from 0 to 8, preferably 1 to 4, with at least one x being equal to at least 1. The high molecular weight aldehyde homopolymers and copolymers are further characterized by a melting point of at least 75° C., i.e., they are substantially inert with respect to the phenolic system until heat activated; and by being substantially completely insoluble in water at a temperature below the melting point. The acetal homopolymers and acetal copolymers are well-known articles of commerce. The polyoxymethylene materials are also well-known and can be readily synthesized by the reaction of monoalcohols having from 1 to 8 carbon atoms or dihydroxy glycols and ether glycols with polyoxymethylene glycols in the presence of an acidic catalyst. A representative method of preparing these crosslinking agents is described in U.S. Pat. No. 2,512,950, which is incorporated herein by reference. Gamma-polyoxymethylene ethers are generally preferred sources of latent formaldehyde and a particularly preferred latent crosslinking agent for use in the practice of the invention is 2-polyoxymethylene dimethyl ether. If utilized, the crosslinking agent is employed in an amount ranging from about 1 to 95, preferably from about 10 to 30 percent by weight of the novolac phenolic resin.

It is presently preferred to utilize a resole phenolic resin as the phenolic resin of the present invention so as to eliminate the need for a curing agent. A particularly preferred phenolic resin is a resole phenolic resin of relatively low molecular weight but relatively high methylol content, for example, in the average molecular weight range of from about 180 to 500 having an average methylol content of between about 1.5 and 5.0 groups per molecule. When a mixture of phenolic resins is utilized in the invention, at least one of the resins is preferably a resole phenolic resin.

The phenolic resin is typically utilized in an amount ranging from about 1 to 85, preferably from about 20 to 70, percent by weight of the essential ingredients of the present adhesive composition.

In addition to the chlorinated polyolefin, the adhesive compositions of the present invention may contain an additional halogenated polymeric material which can function, in addition to the chlorinated polyolefin described above, as a film-forming component. The additional halogenated polymeric material may be essentially any halogenated polymer other than chlorinated polyolefins having the specific chlorine contents and molecular weights described above, and representative examples include chlorinated natural rubber, chlorine- and bromine-containing synthetic rubbers including polychloroprene, chlorinated polychloroprene, chlorinated polybutadiene, butadiene/halogenated cyclic conjugated diene adducts, chlorinated butadiene styrene copolymers, chlorosulfonated polyethylene, brominated poly(2,3-dichloro-1,3-butadiene), copolymers of α-haloacrylonitriles and 2,3-dichloro-1,3-butadiene, polyvinylbutyral, chlorinated poly(vinyl chloride), and mixtures thereof. Thus substantially any of the known halogen-containing derivatives of natural and synthetic elastomers can be employed as additional halogenated polymeric materials in the practice of this invention, including mixtures of such elastomers. It is presently preferred to utilize chlorosulfonated polyethylene or polychloroprene as the additional halogenated polymeric material of the invention.

If utilized, the additional halogenated polymeric material is typically employed in an amount ranging from about 1 to 99, preferably from about 40 to 60, percent by weight of the total ingredients (excluding water and solvent) of the present adhesive composition.

The adhesive compositions of the present invention may optionally contain an acid-scavenging compound for purposes of consuming any acid compound by-products produced during the bonding process. The acid-scavenging compound of the present invention can be any known metal oxide such as the oxides of zinc, cadmium, magnesium, lead, and zirconium; litharge; zirconium salts; and combinations thereof. The acid-scavenging compound may also be an oxirane (epoxy) compound.

If utilized, the acid-scavenging compound is typically employed in an amount ranging from about 0.1 to 10, preferably from about 0.5 to 2, percent by weight of the total ingredients (excluding water and solvent) of the present adhesive composition.

The adhesive compositions of the present invention can optionally contain other well-known additives including plasticizers, fillers, pigments, surfactants, dispersing agents, wetting agents, reinforcing agents and the like, in amounts employed by those skilled in the adhesive arts to obtain a desired color and consistency. Examples of optional ingredients include carbon black, silica such as fumed silica, sodium aluminosilicate, titanium dioxide, and organic pigments or dye stuffs.

The adhesive compositions of the present invention may be prepared as solvent-based or water-based formulations. In the case of a solvent-based formulation, the ingredients of the adhesive are combined in an appropriate solvent. The solvent may essentially be any solvent capable of adequately dissolving the ingredients for purposes of forming an adhesive composition capable of being applied as a thin film. Solvents useful for preparing formulations according to the present invention include aliphatic ketones, such as methylethyl ketone, methylisobutyl ketone, aliphatic esters such as ethylacetate and butyl acetate, and aromatic hydrocarbons such as toluene and xylene. The solvent is typically utilized in an amount sufficient to obtain a total solids(non-volatile) content ranging from about 10 to 40, preferably from about 18 to 28, percent.

In the case of water-based formulations, the chlorinated polyolefin is utilized in the form of a latex. The latex of the chlorinated polyolefin may be prepared according to methods known in the art such as by dissolving the chlorinated polyolefin in a solvent and adding a surfactant to the resulting solution. Water can then be added to the solution under high shear to emulsify the polymer. The solvent is then stripped to obtain a latex which can be suitably utilized in a water-based formulation. The latex of the chlorinated polyolefin is then combined with the other ingredients and a sufficient amount of water, preferably deionized water, so as to prepare an adhesive composition having a typical total solids content of between about 10 and 70 percent, preferably between about 30 and 50 percent.

The ingredients of the present adhesive compositions may be blended or mixed in a high speed mixer, pigment dispersion device or other mixing device. Examples of equipment suitable for mixing include a KADY MILL (Kinetic Dispersions Corporation) and a "pearl" mill or sand mill as used for making pigment dispersions in the coatings industry. The adhesive compositions may be applied to a surface to be bonded by spraying, dipping, brushing, wiping, roll-coating or the like, after which the adhesive composition is permitted to dry. If applied to a metal surface, the metal surface is typically cleaned by physical or chemical treatment before application of the adhesive. Examples of metal treatment techniques include abrasion, grit blasting, solvent degreasing, alkaline scouring and phosphatization. The adhesive composition is typically applied in an amount sufficient to form a dry film thickness ranging from about 0.1 to 1.0 mils, preferably from about 0.2 to 0.8 mils.

The adhesive compositions of the present invention are capable of bonding any substrate or surface capable of receiving the adhesive composition. The material, which may be bonded to a surface such as a metal surface in accordance with the present invention, is preferably a polymeric material, including any elastomeric material selected from any of the natural rubbers and olefinic synthetic rubbers including polychloroprene, polybutadiene, neoprene, styrene-butadiene copolymer rubber (SBR), ethylene-propylene-diene terpolymer rubber (EPDM), acrylonitrile-butadiene copolymer rubber, butyl rubber, brominated butyl rubber, combinations thereof, and the like. The surface to which the material is bonded can be any surface capable of receiving the adhesive such as a glass, plastic, or fabric surface, and is preferably a metal surface selected from any of the common structural metals such as iron, steel (including stainless steel), chemically treated steel such as zinc phosphatized steel, lead, aluminum, chemically treated aluminum such as anodized aluminum, copper, brass, bronze, Monel metal, nickel, zinc, and the like.

The present adhesive compositions are preferably utilized to bond an elastomeric material to a metal surface. The adhesive composition is typically applied to the metal surface and the coated metal surface and elastomeric substrate are then brought together under heat and pressure to complete the bonding procedure. The surface of the metal and the elastomeric substrate are typically brought together under a pressure of from about 20.7 to 172.4 Mega Pascals (MPa), preferably from about 20 MPa to 50 MPa. The resulting rubber-metal assembly is simultaneously heated to a temperature of from about 130° C. to 220° C., preferably from about 140° C. to 170° C. The assembly should remain under the applied pressure and temperature for a period of from about 3 minutes to 60 minutes, depending on the cure rate and thickness of the rubber substrate. This process may be carried out by applying the rubber substrate as a semi-molten material to the metal surface as in, for example, an injection-molding process. The process may also be carried out by utilizing compression molding, transfer molding or autoclave curing techniques. After the process is complete, the bond is fully vulcanized and ready for use in a final application.

The adhesive compositions of the invention may be utilized in one- or two-coat adhesive systems. For example, the present adhesive compositions are particularly effective as a one-coat system (no overcoat needed) for bonding polar diene elastomers, such as acrylonitrile-butadiene copolymer rubber containing from about 25 to 80 mole percent nitrile monomer, to a metal surface.

The present adhesive compositions may also be utilized in two-coat systems as adhesive primers which are typically applied directly to a metal surface. A conventional adhesive overcoat may then be applied to the primed metal surface. A two-coat system is typically utilized when bonding non-polar elastomers such as natural rubbers, EPDM and SBR.

The following examples are provided for purposes of illustrating the invention and are not intended to limit the scope of the present invention which is defined by the claims.

EXAMPLE 1

To a laboratory high speed disperser is added 1000 g of methylisobutyl ketone as solvent, 30 g of carbon black, 10 g of zinc oxide, 80 g of titanium dioxide, 20 g of fumed silica, and 50 g of a low molecular weight, highly methylolated resole phenolic resin dissolved at 50 weight percent in methylisobutyl ketone. The temperature of the resulting pigment dispersion is kept below 50° C. by water-jacket cooling, and the disperser continues running until the pigment dispersion fineness reaches a diameter of 1.5 mils or less according to a HAGEMAN grind gauge.

To a separate blending vessel equipped with a stirrer is slowly added until dissolved 300 g of xylene and 150 g of chlorinated polyethylene (CPE-HE 1200—Nippon Paper Industries) having a chlorine content of 68 percent by weight, and a viscosity in toluene at 20 weight percent and 25° C. of 150 centipoise.

The pigment dispersion prepared above and 250 g of a higher molecular weight resole phenolic resin (phenol:o-cresol weight ratio of 88.5:12.5) dissolved at 50 percent by weight in methylisobutyl ketone are added to the chlorinated polyethylene solution, and the resulting mixture is stirred for one hour.

EXAMPLE 2

An adhesive composition is prepared according to the procedure of Example 1, except that the chlorinated polyethylene has a chlorine content of 70 percent, and a viscosity in toluene of 65 centipoise.

EXAMPLE 3

An adhesive composition is prepared according to the procedure of Example 1, except that the chlorinated polyethylene has a chlorine content of 67 percent, and a viscosity in toluene of 20 centipoise.

Comparative Example 4

An adhesive composition is prepared according to the procedure of Example 1, except that traditional chlorinated rubber (SUPERCHLON CR 150—Nippon Paper Industries) is utilized in place of the chlorinated polyethylene.

The adhesive compositions prepared above are coated by dipping onto degreased, grit-blasted steel coupons at a dry film thickness of approximately 0.3 mils. The coated coupons are allowed to dry for approximately one hour at ambient conditions. The adhesive compositions are tested as both one-coat and two-coat adhesive compositions. In the case of the two-coat adhesive composition, a conventional adhesive overcoat (CHEMLOK 220—Lord Corporation) is applied to the surface of the previously coated coupon at a dry film thickness of approximately 0.3 mils and allowed to dry.

The coated coupons are bonded to acrylonitrile-butadiene copolymer rubber (NBR) with a one-coat composition and to natural rubber (NR) and styrene-butadiene rubber (SBR) with a two-coat system. The rubber is bonded to the coated coupons by Compression molding at a temperature of 154° C. at a pressure of 100 kg ft./cm². The bonding times for the NBR, NR, and SBR substrates are 40 minutes, 15 minutes, and 30 minutes, respectively. Some of the coated coupons are exposed to pre-bake or pre-cure heat conditions. When pre-baked, the coupons are exposed to a temperature of 150° C. for 20 minutes. Pre-bake simulates actual production conditions and helps determine if the adhesive remains active enough to successfully bond the rubber compound. The bonded rubber-metal assemblies are then subjected to the following tests.

Initial Adhesion

Bonded parts are pulled to destruction according to ASTM Test D429—Method B with a peel angle modification of 45 degrees. The conducted at room temperature with a test speed of 20 inches per minute. After the bonded part fails, the peak peel strength value (measured in kg/in.) and the percent rubber retention on the adhesive coated area of the part are measured.

Two-Hour Boiling Water

Bonded parts are buffed on the edges with a grinding wheel. The rubber is then tied back over the metal with stainless steel wire so as to stress the bonded area. This exposes the bond line to the environment. Failure is initiated by scoring the bond line with a razor blade. The parts are then placed in a beaker filled with boiling tap water. The parts remain in this environment for 2 hours. The peel strength and percent rubber retention on the part are then measured.

The results of the above tests are set forth in Table 1 below. In the data, reference is made to failure in the rubber body (R). Failure is expressed in terms of percent, and a high percent of failure in the rubber is desirable since this indicates that the adhesive bond is stronger than the rubber itself. The indication X/YR means that the adhesive exhibited a peel strength of X kg/in. and a rubber failure of Y percent.

TABLE 1

| Type | Rubber Substrate | Test | EX. 1 | EX. 2 | EX. 3 | EX. 4 |
|---|---|---|---|---|---|---|
| One-coat | NBR | Initial | 58.5/ 100 R | 63.0/ 97 R | 62.2/ 100 R | 60.2/ 100 R |
| | | Boiling water | 57.8/ 99 R | 51.3/ 48 R | 56.2/ 83 R | 56.7/ 97 R |
| | | Initial(a) | 51.3/ 100 R | 62.2/ 100 R | 60.3/ 68 R | 50.7/ 83 R |
| Two-coat | NR | Initial | 30.3/ 96 R | 27.7/ 100 R | 26.5/ 100 R | 31.2/ 78 R |
| | | Boiling water | 30.5/ 86 R | 29.2/ 100 R | 26.8/ 94 R | 28.7/ 83 R |
| | SBR | Initial | 79.0/ 100 R | 76.2/ 100 R | 75.5/ 100 R | 85.8/ 100 R |

(a)Subjected to pre-bake of 150° C. for 20 minutes.

EXAMPLE 5

To 186 g of a 33:67 by weight mixture of xylene and methylisobutyl ketone is added 30.4 g of chlorinated polyethylene (CPE-HE 1200—Nippon Paper Industries) having a chlorine content of 68 percent and a viscosity in toluene at 20 weight percent and 25° C. of 150 centipoise to form a chlorinated polyethylene solution.

A phenolic resin blend is prepared using 44.5 g of 60 percent low molecular weight, highly methylolated resole phenolic resin in methyl isobutyl ketone and 38.0 g of 70 percent higher molecular weight resole phenolic resin (phenol:o-cresol weight ratio of 88.5:12.5) also in methyl isobutyl ketone. The blend is completed by adding an additional 14.7 g of methyl isobutyl ketone and 6.4 g of the monomethylether of propylene glycol (DOWANOL PM—Dow Chemical Company).

A pigment-filler dispersion is then prepared using 6.0 g of carbon black, 29 g of titanium dioxide, 7.0 g of zinc oxide, 8.0 g of fumed silica, 16.3 g of chlorinated polyethylene (same type as used above in the chlorinated polyethylene solution), 100 g of methyl isobutyl ketone and 50 g of xylene. The resulting dispersion is processed in a laboratory ball mill for approximately 10 minutes and to it is then added with agitation the chlorinated polyethylene solution prepared above followed by the addition with agitation of the phenolic resin blend prepared above.

The resulting primer formulation is coated, by dipping, onto degreased, grit-blasted steel coupons at a dry film thickness of approximately 0.3 mils. The coated coupons are allowed to dry for approximately one hour at ambient conditions and are then dipped in a commercial covercoat (CHEMLOK 220—Lord Corporation) and allowed to dry. The coated coupons are then placed in a mold in contact with ¼"-thick pads of natural rubber. The rubber is simultaneously vulcanized and bonded to the steel coupons by heating in the mold under pressure for 15 minutes at 153° C.

Comparative Example 6

For comparison purposes, coupons are prepared as in Example 5 except that a commercial primer based on traditional chlorinated natural rubber (CHEMLOK 205—Lord Corporation) is utilized. The coupons prepared above are subjected to the initial adhesion and boiling water (extended to 2.5 hours) tests described above as well as to the salt spray test described below.

90-Hour Salt Spray

Bonded parts are prepared as described above in the boiling water test. The parts are then strung on stainless steel wire and placed in a salt spray chamber. The environment inside the chamber is 100° F., 100 percent relative humidity, and 5 percent dissolved salt in the spray, which is dispersed throughout the chamber. The parts remain in this environment for 90 hours. Upon removal, the rubber is peeled from the metal with pliers. The percent rubber retention on the part is then measured.

The results of the above tests are set forth below in Table 2.

TABLE 2

| Example | Initial | Salt Spray | Boiling Water |
|---|---|---|---|
| 5 | 78/100 R | 78 R | 100 R |
| 6 | 84/100 R | 38 R | 75 R |

EXAMPLE 7

A primer formulation is prepared according to Example 5 except that 50 grams of CPE-HE 1200 is utilized as the chlorinated polyethylene of the chlorinated polyethylene solution and the following ingredients are utilized as the pigment-filler dispersion: 30 grams of titanium dioxide, 8.0 grams of carbon black, 8.0 grams of zinc oxide, 8.0 grams of fumed silica, 145 grams of xylene, and 271 grams of methyl isobutyl ketone. The resulting primer is then utilized to bond steel coupons in the manner described in Example 5.

Comparative Example 8

For comparison purposes, coupons are prepared as in Example 7 except that a commercial primer based on traditional chlorinated natural rubber (CHEMLOK 205—Lord Corporation) is utilized. The coupons prepared above are subjected to the initial adhesion, boiling water (extended to 2.5 hours), and salt spray tests described above.

The results of the above tests are set forth in Table 3.

TABLE 3

| Example | Initital | Salt Spray | Boiling Water |
|---------|----------|------------|---------------|
| 7 | 34.5/100 R | 75 R | 100 R |
| 8 | 30.4/100 R | 23 R | 63 R |

As can be seen from the above data in Examples 5–8, a primer composition prepared in accordance with the present invention compares very favorably to commercially available chlorinated natural rubber-based adhesive systems with respect to bond strength and resistance to adverse environmental conditions.

Phase Separation Test

Also for comparison purposes, a 100 gram sample of the Example 7 primer formulation and a 100 gram sample of a standard commercial primer, CHEMLOK 205, are thoroughly mixed and set aside for 30 days to assess each primer's tendency towards phase separation on storage. After 30 days, the upper phase (clear, darkish brown in color) of the experimental primer (Example 7) comprised 22 percent of the total volume. The commercial primer's upper phase (clear, lighter brown in color) was 32.5 percent of the total volume. The experimental primer thus demonstrated a lesser tendency towards phase separation in storage. This represents an advantage to potential users because less agitation or mixing would be required prior to use.

What is claimed is:

1. An adhesive composition comprising
   a phenolic resin, and;
   a chlorinated polyolefin wherein the chlorinated polyolefin has a chlorine content greater than about 60 percent and a molecular weight greater than about 500; and
   wherein the chlorinated polyolefin is utilized in an amount ranging from 35% to 70% by weight, and the phenolic resin is utilized in an amount ranging from about 20% to 70% by weight.

2. An adhesive composition according to claim 1 wherein the polyolefin of the chlorinated polyolefin is selected from the group consisting of polyethylene, polypropylene, ethylene-propylene copolymer, ethylene-propylene-diene terpolymer, ethylene-propylene-hexadiene terpolymer, ethylene-propylene-dicyclopentadiene terpolymer, and ethylene-propylene-ethylidenenorbornene terpolymer.

3. An adhesive composition according to claim 2 wherein the polyolefin is polyethylene.

4. An adhesive composition according to claim 1 wherein the chlorine content of the chlorinated polyolefin is in the range from about 60 to 75 percent.

5. An adhesive composition according to claim 4 wherein the chlorine content is in the range from about 65 to 70 percent.

6. An adhesive composition according to claim 1 wherein the chlorinated polyolefin is prepared by a process comprising the steps of:
   (a) forming a suspension or dispersion of a fine polyolefin powder having a high surface area in water; and
   (b) subjecting the suspension or dispersion to chlorine gas in the presence of free radical initiators or ultraviolet irradiation.

7. An adhesive composition according to claim 6 wherein the fine polyolefin powder has a surface area of from about 300 to 20,000 $cm^2$ per gram.

8. An adhesive composition according to claim 1 wherein the phenolic resin is prepared by reacting a phenolic compound with an aldehyde compound.

9. An adhesive composition according to claim 8 wherein the phenolic compound is a monohydroxy aromatic compound, a multi-hydroxy aromatic compound or a combination thereof.

10. An adhesive composition according to claim 9 wherein the phenolic compound is selected from the group consisting of phenol, p-tert-butylphenol, p-phenylphenol, o-ethylphenol, p-chlorophenol, p alkoxyphenol, o-cresol, m-cresol, p-cresol, o-chlorophenol, m-bromophenol, 2-ethylphenol, p-tert-amylphenol, p-octylphenol, nonylphenol, cashew nutshell liquid, resorcinol, phloroglucinol, catechol, pyrocatechol, pyrogallol, naphthol, xylenol, diphenylolpropane, salicylic acid, bisphenol S, p,p'-dihydroxydiphenylether, and combinations thereof.

11. An adhesive composition according to claim 10 wherein the phenolic compound is phenol.

12. An adhesive composition according to claim 8 wherein the aldehyde compound is selected from the group consisting of formaldehyde, acetaldehyde, propionaldehyde, isobutyraldehyde, 2 ethylbutrylaldehyde, 2-methylpentaldehyde, 2-ethylhexaldehyde, paraformaldehyde, trioxane, furfural, hexamethylenetetramine, and benzaldehyde.

13. An adhesive composition according to claim 12 wherein the aldehyde compound is formaldehyde.

14. An adhesive composition according to claim 8 wherein the phenolic resin is a resole phenolic resin.

15. An adhesive composition according to claim 14 wherein the resole phenolic resin has an average molecular weight ranging from about 180 to 500, and an average methylol content ranging from about 1.5 to 5.0 groups per molecule.

16. An adhesive composition according to claim 1 further comprising an additional halogenated polymeric material.

17. An adhesive composition according to claim 16 wherein the additional halogenated polymeric material is selected from the group consisting of chlorinated natural rubber, chlorine- and bromine-containing synthetic rubbers including polychloroprene, chlorinated polychloroprene, chlorinated polybutadiene, butadiene/halogenated cyclic conjugated diene adducts, chlorinated butadiene styrene copolymers, chlorosulfonated polyethylene, brominated poly(2,3-dichloro-1,3-butadiene), copolymers of o-haloacrylonitriles and 2,3- dichloro-1,3-butadiene, polyvinylbutyral, chlorinated poly(vinyl chloride), and mixtures thereof.

18. An adhesive composition according to claim 17 wherein the additional halogenated polymeric material is chlorosulfonated polyethylene or polychloroprene.

19. An adhesive composition according to claim 1 further comprising an acid-scavenging compound.

20. An adhesive composition according to claim 19 wherein the acid-scavenging compound is a metal oxide selected from the group consisting of oxides of zinc, cadmium, magnesium, lead, and zirconium; litharge; zirconium salts; and combinations thereof.

21. An adhesive composition according to claim 19 wherein the acid-scavenging compound is an oxirane compound.

* * * * *